United States Patent
Gammel et al.

(10) Patent No.: US 8,141,167 B2
(45) Date of Patent: Mar. 20, 2012

(54) COMMUNICATION DEVICE AND METHOD OF TRANSMITTING DATA

(75) Inventors: Berndt Gammel, Markt Schwaben (DE); Rainer Goettfert, Taufkirchen (DE); Oliver Kniffler, Munich (DE); Dietmar Scheiblhofer, Kaindorf (AT)

(73) Assignee: Infineon Technologies AG (DE)

( * ) Notice: Subject to any disclaimer, the term of this patent is extended or adjusted under 35 U.S.C. 154(b) by 983 days.

(21) Appl. No.: 11/444,832

(22) Filed: Jun. 1, 2006

(65) Prior Publication Data

US 2007/0028134 A1 Feb. 1, 2007

(30) Foreign Application Priority Data

Jun. 1, 2005 (DE) .................... 10 2005 025 169

(51) Int. Cl.
*H04L 1/06* (2006.01)
*H04L 1/00* (2006.01)

(52) U.S. Cl. ............... 726/30; 726/26; 714/43; 714/52; 714/799; 714/748; 714/750

(58) Field of Classification Search ............ 714/43, 714/52, 750, 799, 824
See application file for complete search history.

(56) References Cited

U.S. PATENT DOCUMENTS 4,703,483 A * 10/1987 Enomoto et al. ............ 714/735
6,327,688 B1  12/2001 Stolitzka et al.
7,626,935 B2 * 12/2009 Austin et al. ................ 370/236

FOREIGN PATENT DOCUMENTS

| DE | 197 22 201 | | 5/1997 |
| DE | 197 22 201 | A1 | 12/1997 |
| FR | 2 749 460 | A1 | 12/1997 |
| GB | 2 313 747 | A | 12/1997 |
| GB | 2 314 747 | A | 1/1998 |

OTHER PUBLICATIONS

Clock, Clock Pulse, Encode, Encoder, Encryption, Synchronization, Synchronous Operation. In Microsoft Computer Dictionary. Microsoft Press 2002.*
Single-pole double-throw. (1992). In Academic Press Dictionary of Science and Technology. Oxford: Elsevier Science & Technology. Retrieved from http://www.credoreference.com/entry/apdst/single_pole_double_throw.*
Kozierok, Charles M. . "Simplex, Full-Duplex and Half-Duplex Operation ." The TCP/IP Guide. Aug. 31, 2004. The TCP/IP Guide. <http://web.archive.org/web/20040831142322/http://www.tcp...e.com/free/t_SimplexFullDuplexandHalfDuplexOperation.htm>.*
Lin et al., "Error Control Coding", Chapters 1 and 22 (Second Edition, 2004).
Christophe Giraud,"DFA on AES".
Hagai Bar-El, et al., "The Sorcerer's Apprentice Guide to Fault Attacks".

* cited by examiner

*Primary Examiner* — Kambiz Zand
*Assistant Examiner* — Imhotep Durham
(74) *Attorney, Agent, or Firm* — Dickstein Shapiro LLP

(57) ABSTRACT

A communication device for transmitting data to a communication partner device includes a transmitter for transmitting transmit data to the communication partner device, a determiner for determining a check value from the transmit data in accordance with a determination specification, a receiver for receiving a verification value from the communication partner device, and a checker configured to compare the check value with the verification value and to provide a fault indication signal as a function of the comparison.

18 Claims, 5 Drawing Sheets

COMMUNICATION DEVICE AND METHOD OF TRANSMITTING DATA

CROSS-REFERENCE TO RELATED APPLICATION

This application claims priority to German Patent Application No. 102005025169.2, which was filed on Jun. 1, 2005, and is incorporated herein by reference in its entirety.

BACKGROUND OF THE INVENTION

1. Field of the Invention

The present invention relates to communication systems and methods for transmitting data as may be used, in particular, in connection with bus systems requiring on-line fault detection.

2. Description of Prior Art

Bus connections are used to interconnect two or several system modules and thus to enable communication between these modules.

For example, two chips may be interconnected via a bus which cannot or need not be physically protected for reasons relating to the system. The chips may be a security controller and an external memory chip which are interconnected. To achieve a high level of security, the connection must be protected against fault attacks. It is not sufficient that the data to be stored be encrypted and decrypted, respectively, on the controller, and be stored in the memory in an encrypted form. This ensures only the privacy of the data, but not the integrity. A bus encryption, for example by means of a streaming cipher, so as to ensure the integrity, is no more helpful. This would only thwart the possibility of a targeted manipulation or a replay attack.

Two chips may also be interconnected using a specific face-to-face technology, for example an F2F technology which is specific to Infineon. Assuming that the face-to-face connection does not physically provide a reliable protection from manipulations of the bit lines of the bus, the same situation arises as in the case of two separate chips.

In addition, two or more hardware modules on a chip may be interconnected via bus lines. In the event that the modules themselves are already protected by certain measures, such as RSA or AES for crypto-coprocessors, measures for providing protection in the transmission must be taken.

So-called fault attacks represent a serious threat to the implementation of cryptographic algorithms or, in general, of systems processing secret data. This is true irrespective of whether the algorithm is implemented in software or as a hardware module. If an attacker is capable of disrupting the algorithm during the processing in such a manner that internal intermediate results, for example keys of rounds or intermediate results of rounds, one-bit faults or multi-bit faults, these faults lead to faulty encryption results or decryption results. The secret key may be calculated, in a cryptographic analysis, from only a small number of such results. It is not even necessary to inject the bit faults at targeted positions. According to C. Giraud, DFA on AES, Oberthur Card Systems, 25, rue Auguste Blanche, 92800 Puteaux, France, for example, as few as 50 faulty results will be sufficient with one-bit faults, or about 250 faulty results will be sufficient with byte faults.

Interspersing faults may immediately disrupt the program flow, so that the program will follow wrong branches at jumps, or the program counter will be modified such that the program is continued at a wrong location.

A measure of protecting the transmission from fault attacks in those cases of connection which have already been described is represented by error-detecting codes (EDC). A check word P is calculated for each block M transmitted via the bus, and said check word P is transmitted along with block M as a so-called code word C=(M, P). To simplify matters, a systematic code will be assumed.

If, for example, a 32-bit data word M is transmitted, and a probability of $<=2^{-32}$ of non-detection of a fault is called for, the check word P must have a length of $>=32$ bits. Therefore, this means an overhead of $>=100\%$. With, for example, a data block length of 128 bits and a check word length of 32 bits, the overhead is $>=25\%$. For the bus transmission, this means a bandwidth reduction of 100% and 25%, respectively.

Solutions have been known by means of which faults in circuits may be detected. In this case, fault detection always requires redundancy. Countermeasures against fault attacks have been described, for example, in H. Bar El, H. Choukri, D. Naccache, M. Tunstall, C. Whelan, The Sourcere's Apprentice Guide to Fault Attacks, Eprint IACR 2004-100. Shu Lin, Daniel J. Costello, Fault Control Coding, Second Edition Prentice Hall; 2nd edition (Apr. 1, 2004), ISBN: 0130426725 describes the use of codes which are processed and transmitted along with the payload data. However, a solution to the problem of bandwidth reduction by means of redundancy is not known.

SUMMARY OF THE INVENTION

The present invention provides a communication device, a method, a computer program as well as communication systems and which enable a more secure transmission of data.

In accordance with a first aspect, the invention provides a communication device for transmitting data to a communication partner device arranged separately from the communication device, having a transmitter for transmitting transmit data to the communication partner device;

a determiner configured to determine a CD check value from the transmit data in accordance with a determination specification;

a receiver for receiving a CPD verification value from the communication partner device; and a checker configured to compare the CD check value and the CPD verification value, and to provide a fault indication signal as a function of the comparison.

In accordance with a second aspect, the invention provides a method of transmitting data to a communication partner device arranged separately from the communication device, the method including the steps of:

a) transmitting transmit data to the communication partner device;

b) determining a CD check value from the transmit data in accordance with a determination specification;

c) receiving a CPD verification value from the communication partner device; and d) comparing the CD check value and the CPD verification value, and providing a fault indication signal as a function of the comparison.

In accordance with a third aspect, the invention provides a computer program having a program code for performing the method of transmitting data to a communication partner device arranged separately from the communication device, the method including the steps of:

a) transmitting transmit data to the communication partner device;

b) determining a CD check value from the transmit data in accordance with a determination specification;

c) receiving a CPD verification value from the communication partner device; and
d) comparing the CD check value and the CPD verification value, and providing a fault indication signal as a function of the comparison, when the computer program runs on a computer.

In accordance with a fourth aspect, the invention provides a communication system having:

a communication device for transmitting data to a communication partner device arranged separately from the communication device, having
- a first transmitter for transmitting transmit data to the communication partner device;
- a first determiner configured to determine a CD check value from the transmit data in accordance with a determination specification;
- a first receiver for receiving a CPD verification value from the communication partner device; and
- a checker configured to compare the CD and the CPD verification values, and to provide a fault indication signal as a function of the comparison;

and a communication partner device for receiving data from the communication device, having
- a second receiver configured to receive receive data from the communication device;
- a second determiner configured to determine the CPD verification value from the receive data in accordance with the determination specification; and
- a second transmitter configured to transmit the CPD verification value to the communication device.

In accordance with a fifth aspect, the invention provides a communication system having:

a first communication device for transmitting data to a communication partner device arranged separately from the first communication device, having
- a first transmitter for transmitting first transmit data to the communication partner device;
- a first determiner configured to determine a first CD check value from the first transmit data in accordance with a first determination specification;
- a first receiver for receiving a first CPD verification value from the communication partner device; and
- a first checker configured to compare the first CD check value and the first CPD verification value, and to provide a first fault indication signal as a function of the comparison;

and a second communication device for transmitting data to the communication partner device arranged separately from the second communication device, having
- a second transmitter for transmitting transmit data to the communication partner device;
- a second determiner configured to determine a second CD check value from the second transmit data in accordance with a second determination specification;
- a second receiver for receiving a second CPD verification value from the communication partner device; and
- a second checker configured to compare the second CD check value and the CPD verification value, and to provide a second fault indication signal as a function of the comparison, wherein the first and second CPD verification values are determined, in accordance with the first and second determination specifications, respectively, from respective transmit data received by the communication partner device.

A communication device for transmitting data to a communication partner device arranged separately from the communication device includes, in accordance with the present invention, a transmitting means for transmitting transmit data to the communication partner device, a determining means configured to determine a CD check value from the transmit data in accordance with a determination specification, a receiving means for receiving a CPD verification value from the communication partner device, and a checking means for comparing the CD check value and the CPD verification value, and for providing a fault signal as a function of the comparison.

In accordance with an embodiment of the present invention, a communication system includes two or more communication devices coupled to one another via a bus system.

In accordance with the present invention, a communication method of transmitting data to a communication partner device arranged separately from the communication device, comprises the steps of transmitting transmit data to the communication partner device, a step of determining a CD check value (114) from the transmit data in accordance with a determination specification, a step of receiving a CPD verification value (116) from the communication partner device and a step of comparing the CD check value and the CPD verification value, and a step of providing a fault, or error, indication signal (118) as a function of the comparison result.

The present invention is based on the findings that the bandwidth problem, which results when further redundancy data is transmitted in addition to the payload data, may be avoided in that a transmitter in the form of a communication device merely transmits the payload data, in the form of the transmit data, to the receiver, in that the redundancy data is stored, however, in the transmitter in the form of the check value rather than having to be transmitted to the receiver in the form of a communication partner device. In order to verify that the receiver has received the payload data correctly, the receiver determines, from the payload data received, further redundancy data and transmits it to the transmitter. The transmitter compares the redundancy data received by the transmitter from the receiver to the redundancy data stored in the transmitter. If the redundancy data matches, one can assume that the payload data has been correctly transmitted from the transmitter to the receiver. In that the redundancy data is transmitted in the opposite direction with regard to the transmission direction of the payload data, it does not lead to a bandwidth reduction in the transmission direction of the payload data. Thus, a bandwidth reduction may be completely avoided without reducing the level of security in comparison with known solutions wherein the redundancy data is transmitted along with the payload data. The redundancy data may be stored in a storage means in the communication device.

In accordance with an embodiment of the present invention, a connection between modules is implemented by unidirectional buses. In design terms, such a topology is generally preferred anyway. The presence of one connection in each of the opposite directions, respectively, may be exploited to circumvent bandwidth reduction. The inventive approach has several advantages. The inventive approach enables a detection of a faulty data transmission without a reduction of the maximum possible data throughput occurring. In addition, overhead in terms of hardware for implementing the inventive solution is very small. Moreover, there is no more so-called single point of failure, and for reasons related to the principle, it is only with a very small probability that identical faults can occur in two data paths.

BRIEF DESCRIPTION OF THE DRAWINGS

These and other objects and features of the present invention will become clear from the following description taken in conjunction with the accompanying drawing, in which.

DESCRIPTION OF PREFERRED EMBODIMENTS

Figure 1:
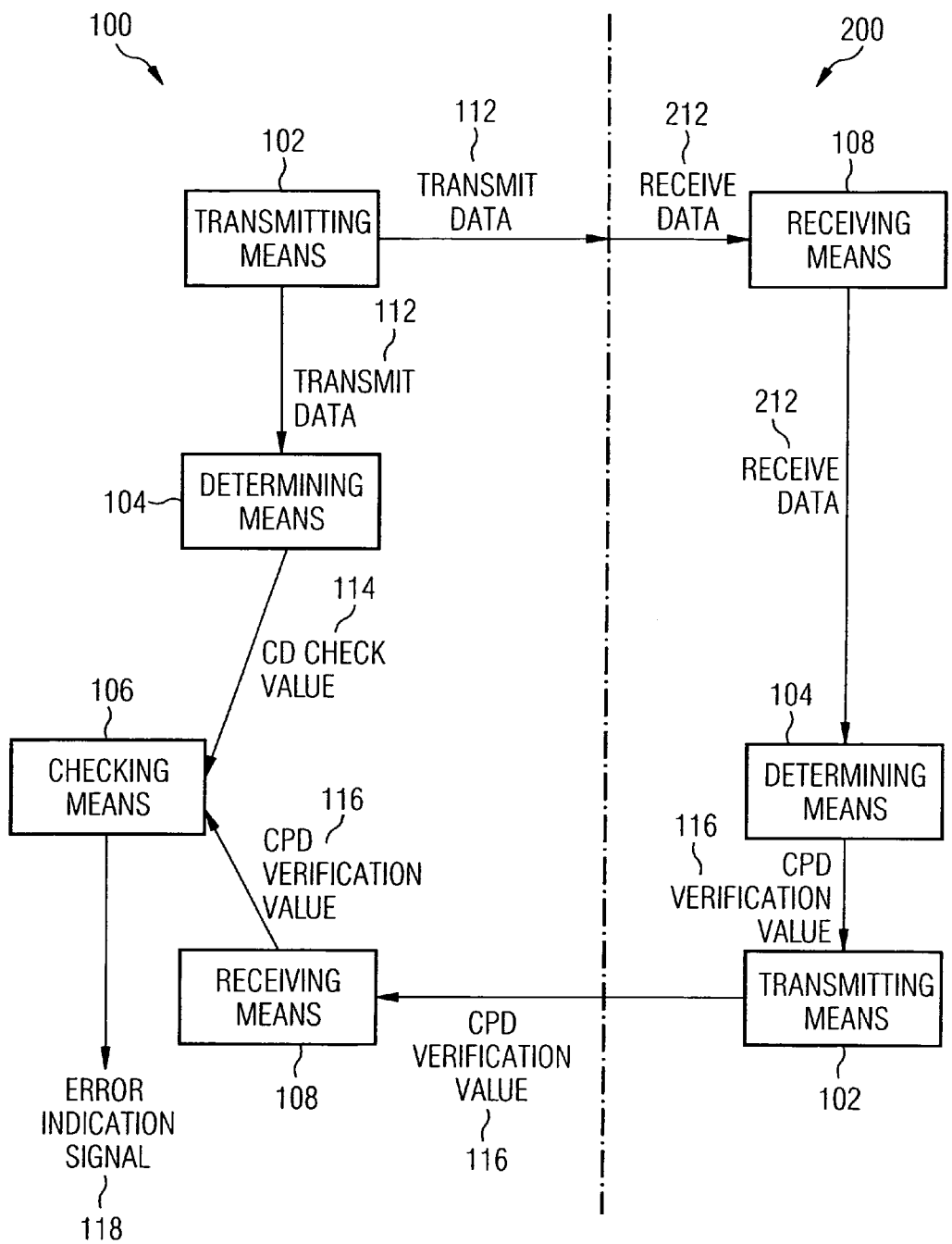
FIG. 1 shows a communication system in accordance with the present invention.

In the following description of the preferred embodiments of the present invention, identical or similar reference numerals will be used for elements represented in the various drawings which have similar actions, a repeated description of these elements being dispensed with.

Figure 2:
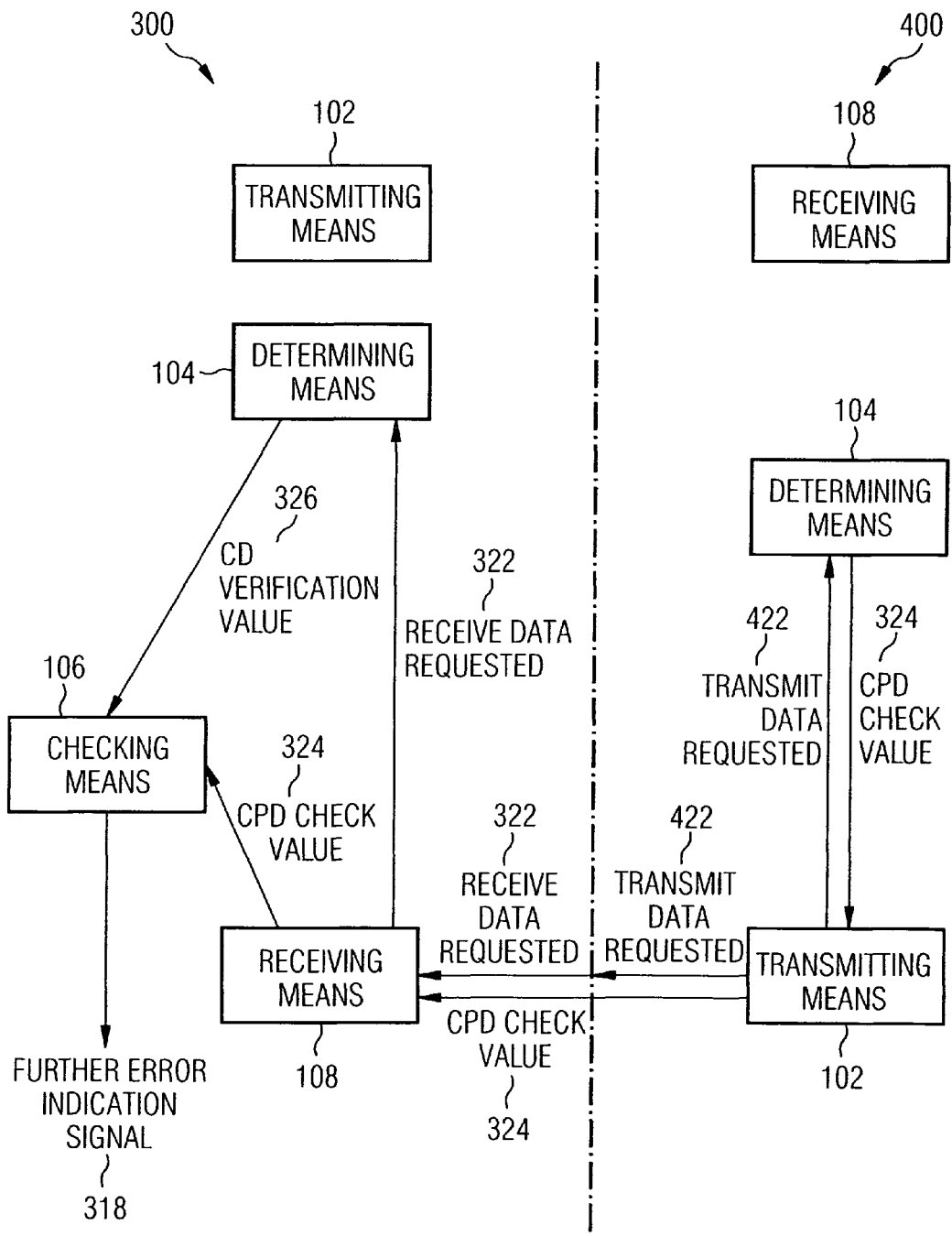
FIG. 2 shows a communication system in accordance with a further embodiment of the present invention.

FIGS. 1 and 2 show a plurality of communication devices and communication partner devices having different functionalities in each case. The functionalities of the individual communication devices may be combined with one other, as is shown, for example, in FIG. 4.

FIG. 1 shows a communication device 100 and a communication partner device 200. The communication device 100 and the communication partner device 200 are arranged separately from each other and interconnected via a transmission channel. Communication device 100 exhibits a write functionality by means of which payload data may be transmitted from communication device 100 to communication partner device 200. Communication partner device 200 exhibits a write reception functionality by means of which payload data which has been transmitted from communication device 100 to communication partner device 200 during a write operation may be received. Communication partner device 200 further is configured to determine a check word from the payload data received, and to transmit the check word to communication device 100. Communication device 100 further is configured to determine a further check word from the payload data to be transmitted, and to compare the further check word to the received check word of communication partner device 200 and to detect, depending on the comparison result, whether the payload data has been correctly received by communication partner device 200.

Communication device 100 includes a transmitting means 102, a determining means 104, a checking means 106 and a receiving means 108. The transmitting means 102 is configured to output transmit data 112, which is to be transmitted, to a transmission channel, for example a unidirectional bus, so that the transmit data 112 is transmitted to communication partner device 200. Transmitting means 102 further is configured to provide the transmit data 112 to determining means 104. Determining means 104 is configured to determine a CD check value 114 from the transmit data 112. CD check value 114 is determined, in accordance with a determination specification, within determining means 104. Determining means 104 provides CD check value 114 to checking means 106. Receiving means 108 is configured to receive a CPD verification value 116 from communication partner device 200 and to provide it to checking means 106. The CPD verification value 116 was determined in communication partner device 200, from the transmit data received by communication partner device 200, in accordance with the same determination specification by means of which CD check value 114 was determined in determining means 104. In the event of a faulty transmission, CD check value 114 matches CPD verification value 116. Check values 114, 116 are compared in checking means 106. Checking means 106 is configured to compare check values 114, 116 with each other. In this embodiment, in the event of a mismatch, a fault indication signal 118 is generated which signalizes a transmission error. Alternatively, the fault indication signal 118 may also indicate correct transmission.

Communication partner device 200 includes a receiving means 108, a determining means 104 and a transmitting means 102, which correspond to the means of communication device 100 but exhibit addition functionalities. Alternatively, the means of communication partner device 200 may also be means which do not exhibit the functionalities that were described with reference to communication device 100, but exhibit only those functionalities which will be described below with reference to communication partner device 200. Receiving means 108 of communication partner device 200 is configured to receive the receive data 212 and to provide it to determining means 104. If no fault has occurred in the transmission between communication means 100 and communication partner device 200, the receive data 212 is the transmit data 112 of communication device 100. Determining means 104 of communication partner device 200 is configured to determine a CPD verification value 116 from the receive data 112 in accordance with that determination specification in accordance with which the CD check value in communication device 100 was determined as well. Determining means 104 of communication partner device 200 is configured to provide CPD verification value 116 to transmitting means 102 which, in turn, is configured to output the CPD verification value 116 to a transmission channel, for example a further unidirectional bus, so that CPD verification value 116 is transmitted to communication device 100.

The transmit data 112 may be a single data bit or several data packets. For example, address data may first be transmitted which indicates to communication partner device 200 the positions to which subsequent data packets are to be stored and/or forwarded. If the transmit data 112 is a plurality of packets, the determining means 104 may be configured to determine shared check values 114, 116 from all data packets, separate check values 114, 116 from individual data packets, or only specific check values 114, 116 from predetermined data packets.

In accordance with an embodiment, the determining means 104 may exhibit a fault recognition code by means of which check values 114, 116 are calculated from data 112, 212.

Transmit data 112 may be transmitted in a non-encrypted or in an encrypted manner from communication means 100 to communication partner device 200. If transmit data 112 is to be transmitted in an encrypted form, communication device 100 additionally comprises an encryption means (not shown in FIG. 1) configured to encrypt internal data, which is to be transmitted, in accordance with an encryption specification and to provide it as transmit data to transmitting means 102 and determining means 104. Also, in this case, communication partner device 200 comprises a decryption means (not shown in FIG. 1) configured to decrypt the receive data 212 in accordance with the encryption specification and to provide it as internally received data. If CD check value 114 was formed from the encrypted transmit data 112 in communication device 100, the CPD verification value 116 is also determined from the encrypted receive data 212 in communication partner device 200. Alternatively, check values 114, 116 may also be determined from the non-encrypted transmit data 112 and/or receive data 212. In this case, in communication device 100, the internal data to be transmitted is forwarded to determining means 104, and the received decrypted internal data in communication partner device 200 is forwarded to determining means 104.

The fault indication signal 118 may be a signal which is further processed internally in communication device 100, or whose value is stored internally, or it may be a signal which is output externally and is received, for example, by communication partner device 200. If the fault indication signal 118 signals a fault, a renewed transmission of transmit data 112 may take place, for example, depending on the security requirement, and communication partner device 200 may be informed that the receive data 212 previously received is faulty, and an alarm may be triggered which guides, for example, the communication system shown in FIG. 1 into a secure mode, or, for example, communication device 100 may be switched off to ensure that a supposed attacker cannot receive any further information. In addition, communication device 100 may include a reset means (not shown in the figures) which performs a RESET on the circuit in a detected case of a fault. In addition, it is possible to power down, or deactivate, the device in the case of a fault so that the circuit no longer participates in the communication.

FIG. 2 shows a further embodiment of a communication system in accordance with the present invention, comprising a communication device 300 and a communication partner device 400. The communication device 300 may perform a read operation wherein payload data to be read is received, by communication partner device 400, along with a check word which was determined, by communication partner device 400, from the payload data requested. Communication device 300 is further configured to determine a further check word from the payload data received and to compare it with the check word received. Depending on the comparison, communication device 300 may indicate a faulty or correct transmission of the payload data.

Communication device 300 includes a transmitting means 102, a determining means 104, a checking means 106 and a receiving means 108. Communication partner device 400 also comprises a receiving means 108, a determining means 104 as well as a transmitting means 102. The means of communication device 300 and of communication partner device 400 may be the means described with reference to FIG. 1, which are provided with additional functionalities, or they may be means which have only those functionalities which will be described below with reference to FIG. 2. If the means are means which exhibit only the functionalities described below with reference to FIG. 2, transmitting means 102 will not be required for communication means 300, and receiving means 108 will not be required for communication partner device 400.

Communication device 300 is configured to receive, for example in a read cycle, receive data 322 requested, along with a CPD check value 324. The receive data 322 requested as well as the CPD check value 324 are provided by communication partner device 400. Receiving means 108 of communication device 300 is configured to provide the receive data 322 requested to determining means 104, and to provide the CPD check value 324 received to checking means 106. Determining means 104 is configured to determine a CD verification value 326 from the receive data 322 requested, in accordance with the determination specification, and to provide it to checking means 106. Checking means 106 is configured to compare verification values 324, 326 with each other and to provide a further fault indication signal 318 as a function of the result of the comparison.

Communication partner device 400 is configured to output, for example in a read operation, the transmit data 422 requested from communication device 300. To this end, transmitting means 102 of communication partner device 400 is configured to output the transmit data 422 to a unidirectional bus, for example, and to transmit it to receiving means 108 of communication device 300. If no fault occurs during the transmission, the receive data 322, which are requested, of communication means 300 will match the transmit data 422, which are requested, of communication partner device 400. Transmitting means 102 of communication partner device 400 is further configured to provide the transmit data 422 requested to determining means 104. Determining means 104, in turn, is configured to provide, in accordance with the determination specification, the CPD check value 324 from the transmit data 422 requested to transmitting means 102 which also outputs the CPD check value 324 to communication means 300, for example via the unidirectional bus. The CPD check value 324 may be transmitted via the same bus via which the transmit data 422 requested are transmitted. Alternatively, a separate bus may be used.

If check value 324 and transmit data 422 are transmitted via the same transmission channel, transmitting means 102 may comprise a changeover switch which either switches the transmit data 422 requested or the CPD check value 324 through to the transmission channel, so that there will be an overlap between the transmit data 422 requested and the CPD check value 324.

Figure 4:
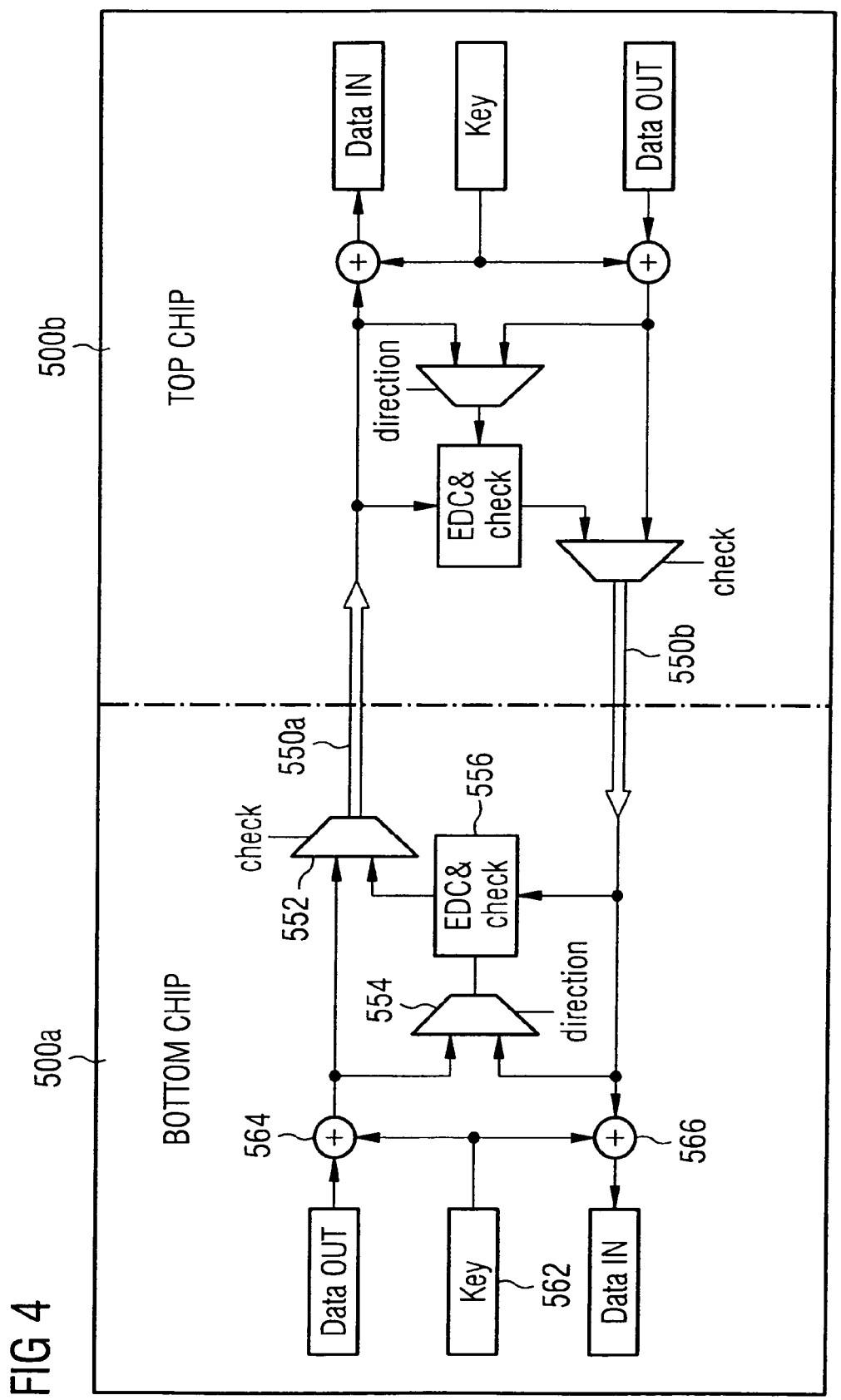
FIG. 4 shows a communication system in accordance with a further embodiment of the present invention.

If the means of communication device 100 also exhibit the features of the means of communication partner device 200, two such communication devices may be coupled, as is shown, for example, in FIG. 4. Such a coupling is also possible if the communication device 300 shown in FIG. 2 also exhibits the features of communication partner device 400. In this case, two such communication devices may be coupled to one another. In addition, a communication device may comprise the features of the means of communication devices 100, 300 as well as of communication partner devices 200, 400 in a combined form, as is represented, for example, in the embodiment described in FIG. 4.

Figure 3:
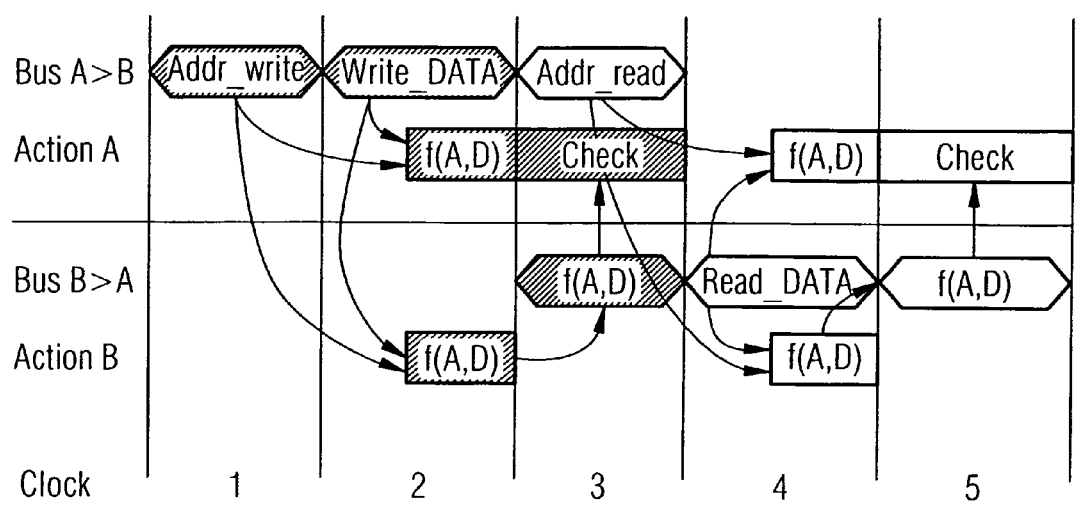
FIG. 3 shows a communication method in accordance with an embodiment of the present invention.

In accordance with an embodiment of the present invention, FIG. 3 represents a method for transmitting data between a module A and a module B which are interconnected via two unidirectional buses A>B and B>A. FIG. 3 shows two typical successive bus access operations. Here, module A successively performs a write access, for example, and a read access, for example, on module B.

In a first clock cycle, an address transfer from module A to module B is performed.

In a second clock cycle, a data transfer of data D from module A to module B is performed. At the same time, an EDC (fault-recognizing code) and a check word $c1=f(A,D)$ over data D transmitted and, optionally, addresses A is calculated in module A. Module B calculates an EDC check word $c2=f(A,D)$ over the data D received and, optionally, address A.

In a third clock cycle, an address transfer of the next bus cycle is performed from module A to module B. In addition, module B re-transfers check word c2 back to module A via the free bus B>A. Module A compares check words c1 and c2. In the event of a mismatch, a fault is detected and signaled.

It may be seen from FIG. 3 that for the fault code calculation and the fault code transfer, no additional time slot, which would reduce performance, is required on the bus. This means that despite the fault code transfer, the exemplary protocol continues to require no more than two bus cycles, since the fault code transfer is conducted via the bus B>A which extends in the opposite direction.

In a conventional protocol, the check word would be transferred sequentially after the address and the date, and the other side would perform the comparison. Doing so would require 3 bus cycles, which would reduce performance by a factor of 1.5.

The write operation shown in clocks 1, 2 and 3 in FIG. 3 may be conducted, for example, by a communication system in accordance with FIG. 1. In this case, communication device 100 corresponds to module A, and communication partner device 200 corresponds to module B. Bus A>B corresponds to connection lines which connect the transmitting means of communication device 100 to the receiving means of the communication partner device. Bus B>A corresponds to connection lines connecting the transmitting means of communication partner device 200 to the receiving means of communication device 100. In this case, transmit data 112 consists of packets Addr_write and Write_DATA. In communication device 100, check value 114 is formed from address packet A and from data packet D, and this is represented, in FIG. 3, as action A by the function f(A,D), wherein f corresponds to the determination specification. Similarly, verification value 116 is determined in module B. This is represented at action B as f(A,D) in FIG. 3. Verification value 116 is subsequently transmitted to module A via bus B>A, and verification value 116 is compared to check value 114. The comparison, which takes place in module A, is referred to as check under action A.

A read operation such as is represented in FIG. 3 in clock cycles 3, 4 and 5 may be conducted, for example, by the communication system shown in FIG. 2. Since, in accordance with FIG. 3, the address of the data to be read is transmitted as packet Addr_read from module A to module B, communication device 300 shown in FIG. 2 requires transmitting means 102 to transmit the address packet to receiving means 108 of communication partner device 400. In addition, it is required that transmitting means 102 of communication device 300 be configured to transmit the address data to determining means 104, and that receiving means 108 of communication partner device 400 be configured to transmit the address data received to determining means 104. The data packet Read_DATA shown in clock cycle 4 corresponds to the transmit data 422 requested in FIG. 2. In this embodiment, communication partner device 400 is configured to determine, in determining means 104, CPD check value 324 from the address data received and the transmit data 422 requested. This is shown as f(A,D) in FIG. 3 and in action B. Check value 324 is subsequently transmitted to module A, i.e. to communication device 300, via bus B>A. Once communication device 300 has received the data packet in the form of the receive data 322 requested, determining means 104 may determine verification value 326 from the address packet as well as from the data packet received. This is represented as f(A,D) in FIG. 3 and in action A. The comparison between verification value 326 and check value 324 which takes place in checking means 106 of communication device 300 is represented as check in FIG. 3 and in action A.

FIG. 4 shows a schematic representation of a further embodiment of a communication system in accordance with the present invention. The communication system shown in FIG. 4 comprises a first communication device 500a in the form of a bottom chip, and a second communication device 500b in the form of a top chip. In accordance with this embodiment, the communication devices 500a, 500b are identical and are interconnected via two unidirectional buses 550a, 550b. The architecture of communication devices 500a, 500b will be described below with reference to communication device 500a. Communication device 500a comprises a transmitting means which enables output data Data OUT to be output to unidirectional bus 550a via a changeover switch 552. The output data is additionally provided to a comparing and checking means EDC+check 556 via a further changeover switch 554. In addition, communication device 500a comprises a receiving means configured to receive received data, Data IN, from the unidirectional bus 550b. The data received from unidirectional bus 550b are also provided to comparing and checking means 556 via the further changeover switch 554. The comparing and checking means 556 is configured to determine a check word from the output data and to output same via changeover switch 552 to unidirectional bus 550a. In addition, comparing and checking means 556 is configured to store the check word output to unidirectional bus 550a, and to compare it with a further check word received via unidirectional bus 550b, and to provide a fault indication signal as a function of the comparison. The fault indication signal may also be output, for example, to unidirectional bus 550a via changeover switch 552, and may thus be made available to communication device 500b.

Since communication devices 500a, 500b shown in FIG. 4 combine the features of communication devices 100, 300 described in FIGS. 1 and 2, and of communication partner devices 200, 400, the system depicted in FIG. 4 may perform both write access operations and read access operations, as are described in FIG. 3. Both communication devices 500a, 500b may appear as initiators of the communication operations, since both communication devices 500a, 500b comprise comparison and control means 556. By contrast, communication partner devices 200, 400 depicted in FIGS. 1 and 2 cannot appear as initiators of any communication operations.

The communication system shown in FIG. 4 allows the EDC protocol described in FIG. 3 to be implemented on a bus which may be encrypted or scrambled. To this end, communication devices 500a, b comprise a key provided to the transmitting means and the receiving means by means 562 characterized as key in FIG. 4. Communication devices 500a, 500b comprise encryption means 564 configured to encrypt the data to be output, Data OUT, using key 562, and to decrypt, on the other hand, the received data in a decryption means 566 using key 562 so as to determine the decrypted data, Data IN.

In accordance with FIG. 4, changeover switch 552 is further configured to receive a check signal which controls the output of the output data and/or of the check word to unidirectional bus 550a. Similarly, the further changeover switch 554 is configured to receive a direction signal which controls a changeover between the output data and the receive data which is subsequently forwarded to comparing and checking means 556.

Communication devices 500a, b may additionally comprise a clock means providing a clock which controls the clock cycles depicted in FIG. 3. The selection of the clock cycles depicted in FIG. 3 is only exemplary.

Figure 5:
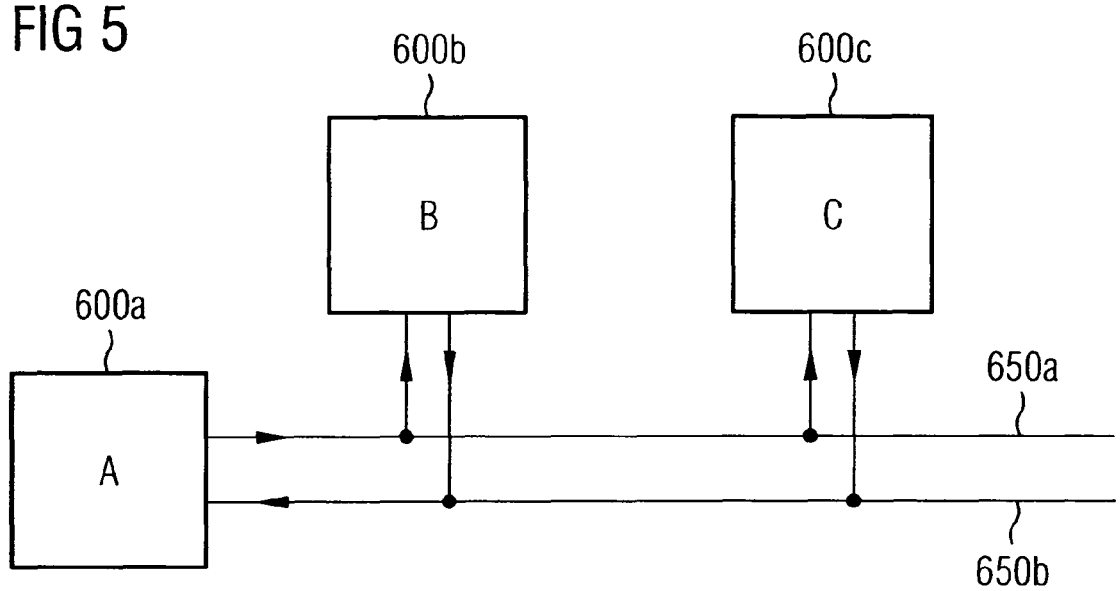
FIG. 5 shows a schematic representation of a communication system in accordance with a further embodiment of the present invention.

FIG. 5 shows a block diagram of a communication system in accordance with a further embodiment of the present invention. FIG. 5 shows three communication devices 600a, b, c coupled to one another via unidirectional buses 650a, b. At least one of communication devices 600a, b, c is a communication device as is depicted as communication devices 100, 300, 500a, b in an exemplary manner in FIGS. 1, 2, 4. If, e.g., communication device 600a is such a communication device, the further communication devices 600b, c may be communication partner devices as are shown, for example, as communication partner devices 200, 400 in FIG. 1 and FIG. 2.

Communication devices 600a, b, c may be discrete chips or devices implemented in one single chip and interconnected via an internal bus. For example, communication device 600a may be a security controller, and communication devices 600b, c may be external memory chips. The transmission of the data may be effected both via hard-wire connections and via wireless communication paths.

Depending on the circumstances, the inventive method of transmitting data may be implemented in hardware or in software. Implementation may occur on a digital storage medium, in particular a disc or CD with electronically readable control signals which can interact with a programmable computer system such that the respective method is performed. Generally, the invention thus also consists in a computer program product with a program code, stored on a machine-readable carrier, for performing the inventive method, when the computer program product runs on a computer. In other words, the invention may thus be realized as a computer program having a program code for performing the method, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A communication device for transmitting data to a communication partner device arranged separately from the communication device, and further for receiving data requested, comprising:
  a transmitter arranged to transmit data to the communication partner device during a write operation of the communication device;
  a determiner arranged to determine a CD check value from the transmit data in accordance with a determination specification in response to the write operation of the communication device;
  a receiver arranged to receive a CPD verification value from the communication partner device in response to the write operation of the communication device; and
  a checker arranged to compare the CD check value and the CPD verification value, and to provide a fault indication signal as a function of the comparison in response to the write operation of the communication device,
  wherein the receiver is further arranged to receive the requested receive data from the communication partner device during a read operation of the communication device, and a CPD check value in response to the read operation of the communication device,
  wherein the determiner is further arranged to determine a CD verification value from the requested receive data in accordance with the determination specification in response to the read operation of the communication device, and
  wherein the checker is further arranged to compare the CPD check value and the CD verification value and to provide a further fault indication signal as a function of the comparison in response to the read operation of the communication device.

2. The communication device as claimed in claim 1, wherein the CPD verification value is determined, in accordance with the determination specification, from the transmit data received by the communication partner device.

3. The communication device as claimed in claim 1, further for receiving data,
  wherein the receiver is further arranged to receive data from the communication partner device,
  wherein the determiner is further arranged to determine the CPD verification value from the receive data in accordance with the determination specification, and
  wherein the transmitter is further arranged to transmit the CPD verification value to the communication partner device.

4. The communication device as claimed in claim 1, further for transmitting requested data to the communication partner device,
  wherein the transmitter is further arranged to send requested transmit data to the communication partner device;
  wherein the determiner is further arranged to determine the CPD check value from the requested transmit data in accordance with the determination specification; and
  wherein the transmitter is further arranged to send the CPD check value to the communication partner device.

5. The communication device as claimed in claim 1, further comprising:
  an encryptor arranged to encrypt or scramble, in accordance with an encryption specification, data which is to be transmitted internally, and to provide it as transmit data to the transmitter; and
  a decryptor arranged to decrypt received data in accordance with the encryption specification, and to provide it as internal data received.

6. The communication device as claimed in claim 1, wherein the transmitter is further arranged to transmit to-be-transmitted data to the communication partner device via a unidirectional transmit channel; and
  wherein the receiver is further arranged to receive to-be-received data from the communication partner device via a further unidirectional transmit channel.

7. The communication device as claimed in claim 6, wherein the transmitter further comprises a changeover switch arranged to couple the data to be transmitted and the check value or verification value to be transmitted into the transmit channel such that there will be no overlap between the data to be transmitted and the check values or verification values to be transmitted.

8. The communication device as claimed in claim 1, further comprising a clock arranged to provide a clock signal, the transmitter being further arranged to transmit first transmit data in a first clock cycle, and to transmit second transmit data in a second clock cycle, and
  wherein the determiner is further arranged to determine the CD check value from the first and second transmit data in the second clock cycle, and wherein the receiver is further arranged to receive the CPD verification value in a third clock cycle.

9. The communication device as claimed in claim 3, further including a further clock arranged to provide a further clock signal, wherein the transmitter is further arranged to transmit data in a further first clock cycle, and
  wherein the receiver is further arranged to receive requested receive data in a further second clock cycle, and to receive the CPD check value in a further third clock cycle, and wherein the determiner is further arranged to determine the CD verification value from the transmit data and the requested receive data in the further second clock cycle.

10. The communication device as claimed in claim 1, wherein the determination specification comprises a fault recognizing code.

11. The communication device as claimed in claim 1, further comprising a memory arranged to store the CD check value which is arranged to provide the stored CD check value to the checker.

12. The communication device as claimed in claim 1, further comprising a resetter arranged to reset the communication device in response to the fault indication signal.

13. A method of transmitting data to a communication partner device arranged separately from the communication device, and further for receiving data requested, the method comprising:
   a) transmitting transmit data to the communication partner device during a write operation of the communication device;
   b) determining a CD check value from the transmit data in accordance with a determination specification in response to the write operation of the communication device;
   c) receiving a CPD verification value from the communication partner device in response to the write operation of the communication device; and
   d) comparing the CD check value and the CPD verification value, and providing a fault indication signal as a function of the comparison in response to the write operation of the communication device,
   wherein the step of receiving further comprises receiving the requested receive data from the communication partner device during a read operation of the communication device, and a CPD check value in response to the read operation of the communication device,
   wherein the step of determining further comprises determining a CD verification value from the requested receive data in accordance with the determination specification in response to the read operation of the communication device; and
   wherein the step of checking further comprises comparing the CPD check value and the CD verification value and providing a further fault indication signal as a function of the comparison in response to the read operation of the communication device.

14. A computer program comprising a program code for performing the method of transmitting data to a communication partner device arranged separately from the communication device, and further for receiving data requested, the method comprising:
   a) transmitting transmit data to the communication partner device during a write operation of the communication device;
   b) determining a CD check value from the transmit data in accordance with a determination specification in response to the write operation of the communication device;
   c) receiving a CPD verification value from the communication partner device in response to the write operation of the communication device; and
   d) comparing the CD check value and the CPD verification value, and providing a fault indication signal as a function of the comparison in response to the write operation of the communication device,
   wherein the step of receiving further comprises receiving the requested receive data from the communication partner device during a read operation of the communication device, and a CPD check value in response to the read operation of the communication device,
   wherein the step of determining further comprises determining a CD verification value from the requested receive data in accordance with the determination specification in response to the read operation of the communication device; and
   wherein the step of checking further comprises comparing the CPD check value and the CD verification value and providing a further fault indication signal as a function of the comparison in response to the read operation of the communication device,
   when the computer program runs on a computer.

15. A communication system comprising:
   a communication device arranged to transmit data to a communication partner device arranged separately from the communication device, and further arranged to receive data requested, comprising:
   a first transmitter arranged to transmit data to the communication partner device during a write operation of the communication device;
   a first determiner arranged to determine a CD check value from the transmit data in accordance with a determination specification in response to the write operation of the communication device;
   a first receiver arranged to receive a CPD verification value from the communication partner device in response to the write operation of the communication device; and
   a first checker arranged to compare the CD check value and the CPD verification value, and to provide a fault indication signal as a function of the comparison in response to the write operation of the communication device,
   wherein the first receiver is further arranged to receive the requested receive data from the communication partner device during a read operation of the communication device, and a CPD check value in response to the read operation of the communication device,
   wherein the first determiner is further arranged to determine a CD verification value from the requested receive data in accordance with the determination specification in response to the read operation of the communication device, and
      wherein the first checker is further arranged to compare the CPD check value and the CD verification value and to provide a further fault indication signal as a function of the comparison in response to the read operation of the communication device;
   and
   a communication partner device arranged to receive data from the communication device, comprising:
      a second receiver arranged to receive data from the communication device;
      a second determiner arranged to determine the CPD verification value from the receive data in accordance with the determination specification; and
      a second transmitter arranged to transmit the CPD verification value of the receive data to the communication device.

16. A communication system comprising:
   a first communication device for first transmitting data to a communication partner device arranged separately from the communication device, and further for receiving data requested, comprising:
   a first transmitter arranged to transmit data to the communication partner device during a write operation of the first communication device;

a first determiner arranged to determine a CD check value from the transmit data in accordance with a determination specification in response to the write operation of the first communication device;

a first receiver arranged to receive a CPD verification value from the communication partner device in response to the write operation of the first communication device; and a first checker arranged to compare the CD check value and the CPD verification value, and to provide a fault indication signal as a function of the comparison in response to the write operation of the first communication device, wherein the first receiver is further arranged to receive the requested receive data from the communication partner device during a read operation of the communication device, and a CPD check value in response to the read operation of the first communication device, wherein the first determiner is further arranged to determine a CD verification value from the requested receive data in accordance with the determination specification in response to the read operation of the first communication device, and wherein the first checker is further arranged to compare the CPD check value and the CD verification value and to provide a further fault indication signal as a function of the comparison in response to the read operation of the first communication device and a second communication device arranged to transmit data to the communication partner device arranged separately from the second communication device, comprising:

a second transmitter arranged to transmit second transmit data to the communication partner device;

a second determiner arranged to determine a second CD check value from the second transmit data in accordance with a second determination specification;

a second receiver arranged to receive a second CPD verification value from the communication partner device; and a second checker arranged to compare the second CD check value and the second CPD verification value, and to provide a second fault indication signal as a function of the comparison, wherein the first and second CPD verification values are determined, in accordance with the first and second determination specifications, respectively, from respective first and second transmit data received by the communication partner device.

17. The communication device as claimed in claim 1, wherein the transmitter is further arranged to transmit request data to the communication partner device for initiating a read operation of the communication device.

18. The communication system as claimed in claim 15, wherein the communication device is implemented as a bottom chip of the communication system, wherein the communication partner device is implemented as a top chip of the communication system, and wherein the bottom chip and the top chip are connected through a first and second unidirectional bus.

* * * * *